United States Patent
Lauridsen et al.

(10) Patent No.: US 12,550,178 B2
(45) Date of Patent: Feb. 10, 2026

(54) ADAPTIVE CELLULAR ACCESS

(71) Applicant: Nokia Technologies Oy, Espoo (FI)

(72) Inventors: Mads Lauridsen, Gistrup (DK); Jeroen Wigard, Klarup (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 345 days.

(21) Appl. No.: 18/249,688

(22) PCT Filed: Jan. 14, 2021

(86) PCT No.: PCT/EP2021/050664
§ 371 (c)(1),
(2) Date: Apr. 19, 2023

(87) PCT Pub. No.: WO2022/152378
PCT Pub. Date: Jul. 21, 2022

(65) Prior Publication Data
US 2023/0397259 A1    Dec. 7, 2023

(51) Int. Cl.
*H04W 72/54*    (2023.01)
*H04W 72/542*    (2023.01)
(Continued)

(52) U.S. Cl.
CPC ....... *H04W 72/542* (2023.01); *H04W 74/006* (2013.01); *H04W 74/0833* (2013.01); *H04W 84/06* (2013.01)

(58) Field of Classification Search
CPC .. H04W 72/542; H04W 74/006; H04W 84/06
See application file for complete search history.

(56) References Cited

U.S. PATENT DOCUMENTS

| 10,631,330 B2 | 4/2020 | Vajapeyam et al. |
| 11,083,026 B2 | 8/2021 | Lauridsen et al. |
| (Continued) | | |

FOREIGN PATENT DOCUMENTS

| WO | 2020/198671 A1 | 10/2020 |
| WO | 2022/003234 A1 | 1/2022 |

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 16)", 3GPP TS 36.321, V16.2.0, Sep. 2020, pp. 1-141.
(Continued)

*Primary Examiner* — Brenda H Pham
(74) *Attorney, Agent, or Firm* — Carter, DeLuca & Farrell LLP

(57) ABSTRACT

This document discloses a solution for performing a random access procedure. According to an aspect, a method for a terminal device comprises: receiving, from an access node, system information comprising a first random access configuration and at least a second random access configuration; determining, whether a link loss between the terminal device and the access node is increasing or decreasing; if the link loss is determined to decrease, selecting the first random access configuration and performing the random access with the access node by using the first random access configuration; and if the link loss is determined to increase, selecting the second random access configuration and performing random access with the access node by using the second random access configuration.

2 Claims, 7 Drawing Sheets

(51) Int. Cl.
H04W 74/00 (2009.01)
H04W 74/0833 (2024.01)
H04W 84/06 (2009.01)

(56) References Cited

U.S. PATENT DOCUMENTS

2009/0191875 A1* 7/2009 Vujcic ............... H04W 74/0866
 455/436
2010/0278137 A1* 11/2010 Kwon ................. H04J 13/0059
 370/329

OTHER PUBLICATIONS

"3rd Generation Partnership Project; Technical Specification Group Radio Access Network; Evolved Universal Terrestrial Radio Access (E-UTRA); User Equipment (UE) procedures in idle mode (Release 16)", 3GPP TS 36.304, V16.2.0, Sep. 2020, pp. 1-64.

"New Study WID on NB-IoT/eTMC support for NTN", 3GPP TSG RAN Meeting #86, RP-193235, Agenda: xxx, MediaTek Inc, Dec. 9-31, 2019, 4 pages.

"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331, V16.2.1, Sep. 2020, pp. 1-1081.

International Search Report and Written Opinion received for corresponding Patent Cooperation Treaty Application No. PCT/EP2021/050664, dated Oct. 18, 2021, 14 pages.

"NB-IoT/eMTC features and applicability of NR NTN solutions for IoT over NTN", 3GPP TSG-RAN WG2 Meeting #112 Electronic, R2-2009988, Agenda: 9.2.2, Nokia, Nov. 2-13, 2020, 8 pages.

"Discussion on 2-Step RACH adaptation in NTN", 3GPP TSG-RAN WG2 Meeting #112 Electronic, R2-2009981, Agenda: 8.10.2.1, Nokia, Nov. 2-13, 2020, 4 pages.

* cited by examiner

US 12,550,178 B2

ADAPTIVE CELLULAR ACCESS

RELATED APPLICATION

This application was originally filed as PCT Application No. PCT/EP2021/050664, filed on Jan. 14, 2021, which is incorporated herein by reference in its entirety.

FIELD

Various embodiments described herein relate to the field of wireless communications and, particularly, to adaptive access to a cellular access node.

BACKGROUND

A terminal device of a cellular communication system starts a setup for establishing a radio resource control (RRC) connection via a random access procedure with a selected access node. Because of the mobility of the terminal device or even the access node, e.g. when the access node is non-terrestrial such as a satellite, the random access procedure may fail.

BRIEF DESCRIPTION

Some aspects of the invention are defined by the independent claims.

Some embodiments of the invention are defined in the dependent claims.

The embodiments and features, if any, described in this specification that do not fall under the scope of the independent claims are to be interpreted as examples useful for understanding various embodiments of the invention. Some aspects of the disclosure are defined by the independent claims.

According to an aspect, there is provided an apparatus for a terminal device of a cellular communication system, comprising means for performing: receiving, from an access node, system information comprising a first random access configuration and at least a second random access configuration; determining, whether a link loss between the terminal device and the access node is increasing or decreasing; if the link loss is determined to decrease, selecting the first random access configuration and performing the random access with the access node by using the first random access configuration; and if the link loss is determined to increase, selecting the second random access configuration and performing random access with the access node by using the second random access configuration.

In an embodiment, the means are further configured to determine that the link loss will be less than a determined amount or determine that information on whether the link loss is increasing or decreasing is not available and, in response, to select a third random access configuration and perform the random access with the access node by using the third random access configuration.

In an embodiment, the first random access configuration and the second random access configuration indicate different configurations in terms of at least one of the following parameters: a number of repeated transmissions of a random access signal, a maximum number of transmission attempts of the random access signal, a number of physical random access channel frequency resources, and a transmission timing of the random access signal.

In an embodiment, the means are further configured to measure a received signal strength of a reference signal received from the access node, to determine at least one threshold for selecting a random access configuration, to compare the measured received signal strength with the at least one threshold, and to select the first random access configuration or the second random access configuration further on the basis of the comparison.

In an embodiment, the means are configured to: select the first random access configuration, if the measured received signal strength of the reference signal is above the at least one threshold and the link loss is determined to be decreasing; select the second random access configuration, if the measured received signal strength of the reference signal is below the at least one threshold and the link loss is determined to be increasing.

In an embodiment, the means are configured to receive the at least one threshold from the access node as a part of the system information.

In an embodiment, the means are configured to measure and monitor a received signal strength of a reference signal received from the access node and to determine, on the basis of said monitoring, whether the link loss is increasing or decreasing.

In an embodiment, the access node is a non-terrestrial access node, and wherein means are configured to determine a motion trajectory of the access node with respect to the apparatus and determine, on the basis of said motion trajectory, whether the link loss is increasing or decreasing.

In an embodiment, the means are configured to determine the motion trajectory on the basis of at least one of the following parameters: ephemeris data of the access node, a change in an elevation angle of the access node with respect to the apparatus, a change in a measured Doppler frequency of a signal received from the access node, a change in timing information of the access node.

In an embodiment, the means are configured to, upon determining that the link loss is above a determined threshold and increasing, postpone the random access until either the link loss decreases below the determined threshold or a new cell provided by another access node becomes available for said random access.

In an embodiment, the means are further configured to receive, from the access node a random access response message having the selected random access configuration.

In an embodiment, the means are configured to estimate the link loss within an estimated duration of the random access and to select the first random access configuration or the second random access configuration on the basis of the estimated link loss.

In an embodiment, the means are configured to estimate a decrease in the link loss and to select the first random access configuration on the basis of the estimated decrease, or to estimate an increase in the link loss and to select the second random access configuration on the basis of the estimated increase.

In an embodiment, the first random access configuration is a part of a first enhanced coverage level configuration of 3GPP specifications, and wherein the second random access configuration is a part of a second enhanced coverage level configuration of the 3GPP specifications.

According to an aspect, there is provided an apparatus for an access node of a cellular communication system, comprising means for performing: causing transmission of system information comprising a first random access configuration and at least a second random access configuration; receiving a random access signal from a terminal device and determining which one of the first random access configuration and at least the second random access configuration was used by the terminal device for transmitting the random access signal; and causing transmission of a random access response signal to the terminal device by using the determined random access configuration.

In an embodiment, the means are configured to transmit at least one threshold for selecting one of the first random access configuration and at least the second random access configuration.

In an embodiment, the means comprise at least one processor and at least one memory including computer program code, the at least one memory and computer program code configured to, with the at least one processor, cause the performance of the apparatus.

According to an aspect, there is provided a method comprising: receiving, by a terminal device from an access node, system information comprising a first random access configuration and at least a second random access configuration; determining, by the terminal device, whether a link loss between the terminal device and the access node is increasing or decreasing; if the link loss is determined to decrease, selecting by the terminal device the first random access configuration and performing the random access with the access node by using the first random access configuration; and if the link loss is determined to increase, selecting by the terminal device the second random access configuration and performing random access with the access node by using the second random access configuration.

In an embodiment, the terminal device determines that the link loss will be less than a determined amount or determine that information on whether the link loss is increasing or decreasing is not available and, in response, selects a third random access configuration and performs the random access with the access node by using the third random access configuration.

In an embodiment, the first random access configuration and the second random access configuration indicate different configurations in terms of at least one of the following parameters: a number of repeated transmissions of a random access signal, a maximum number of transmission attempts of the random access signal, a number of physical random access channel frequency resources, and a transmission timing of the random access signal.

In an embodiment, the terminal device measures a received signal strength of a reference signal received from the access node, determines at least one threshold for selecting a random access configuration, compares the measured received signal strength with the at least one threshold, and selects the first random access configuration or the second random access configuration further on the basis of the comparison.

In an embodiment, the method further comprises by the terminal device: selecting the first random access configuration, if the measured received signal strength of the reference signal is above the at least one threshold and the link loss is determined to be decreasing; selecting the second random access configuration, if the measured received signal strength of the reference signal is below the at least one threshold and the link loss is determined to be increasing.

In an embodiment, the terminal device receives the at least one threshold from the access node as a part of the system information.

In an embodiment, the terminal device measures and monitors a received signal strength of a reference signal received from the access node and determines, on the basis of said monitoring, whether the link loss is increasing or decreasing.

In an embodiment, the access node is a non-terrestrial access node, and wherein terminal device determines a motion trajectory of the access node with respect to the apparatus and determines, on the basis of said motion trajectory, whether the link loss is increasing or decreasing.

In an embodiment, the terminal device determines the motion trajectory on the basis of at least one of the following parameters: ephemeris data of the access node, a change in an elevation angle of the access node with respect to the apparatus, a change in a measured Doppler frequency of a signal received from the access node, a change in timing information of the access node.

In an embodiment, the terminal device determines, upon determining that the link loss is above a determined threshold and increasing, to postpone the random access until either the link loss decreases below the determined threshold or a new cell provided by another access node becomes available for said random access.

In an embodiment, the terminal device receives, from the access node, a random access response message having the selected random access configuration.

In an embodiment, the terminal device estimates the link loss within an estimated duration of the random access and selects the first random access configuration or the second random access configuration on the basis of the estimated link loss.

In an embodiment, the terminal device estimates a decrease in the link loss and selects the first random access configuration on the basis of the estimated decrease, or estimates an increase in the link loss and selects the second random access configuration on the basis of the estimated increase.

In an embodiment, the first random access configuration is a part of a first enhanced coverage level configuration of 3GPP specifications, and wherein the second random access configuration is a part of a second enhanced coverage level configuration of the 3GPP specifications.

According to an aspect, there is provided a method comprising: causing, by an access node, transmission of system information comprising a first random access configuration and at least a second random access configuration; receiving, by the access node, a random access signal from a terminal device and determining which one of the first random access configuration and at least the second random access configuration was used by the terminal device for transmitting the random access signal; and causing, by the access node, transmission of a random access response signal to the terminal device by using the determined random access configuration.

In an embodiment, the access node transmits at least one threshold for selecting one of the first random access configuration and at least the second random access configuration.

According to an aspect, there is provided a computer program product embodied on a computer-readable medium and comprising a computer program code readable by a computer, wherein the computer program code configures the computer to carry out a computer process for a terminal device, comprising: receiving, from an access node, system information comprising a first random access configuration and at least a second random access configuration; determining, whether a link loss between the terminal device and the access node is increasing or decreasing; if the link loss is determined to decrease, selecting the first random access configuration and performing the random access with the access node by using the first random access configuration; and if the link loss is determined to increase, selecting the second random access configuration and performing random access with the access node by using the second random access configuration.

According to an aspect, there is provided a computer program product embodied on a computer-readable medium and comprising a computer program code readable by a computer, wherein the computer program code configures the computer to carry out a computer process for an access node, comprising: causing transmission of system information comprising a first random access configuration and at least a second random access configuration; receiving a random access signal from a terminal device and determining which one of the first random access configuration and at least the second random access configuration was used by the terminal device for transmitting the random access signal; and causing transmission of a random access response signal to the terminal device by using the determined random access configuration.

LIST OF DRAWINGS

Embodiments are described below, by way of example only, with reference to the accompanying drawings, in which FIG. 1 illustrates a wireless communication scenario to which some embodiments of the invention may be applied;

DESCRIPTION OF EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. A person skilled in the art will realize that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Embodiments are also applicable to various implementations within the radio access architectures. For example, the third generation partnership project (3GPP) introduced Narrowband Internet-of-Things (NB-IoT) air interface. This concept is aimed to introduce satellite coverage into the radio access network infrastructure to extend its coverage to those areas that where coverage by the terrestrial network is limited. This concept using the satellites is called NB-IoT over non-terrestrial Networks (NTN). Another implementation of the LTE is called enhanced machine type communications (e-MTC also known as LTE-M) that defines a low-complexity user equipment (UE) category called UE category M1 and coverage enhancement (CE) techniques.

Figure 1:
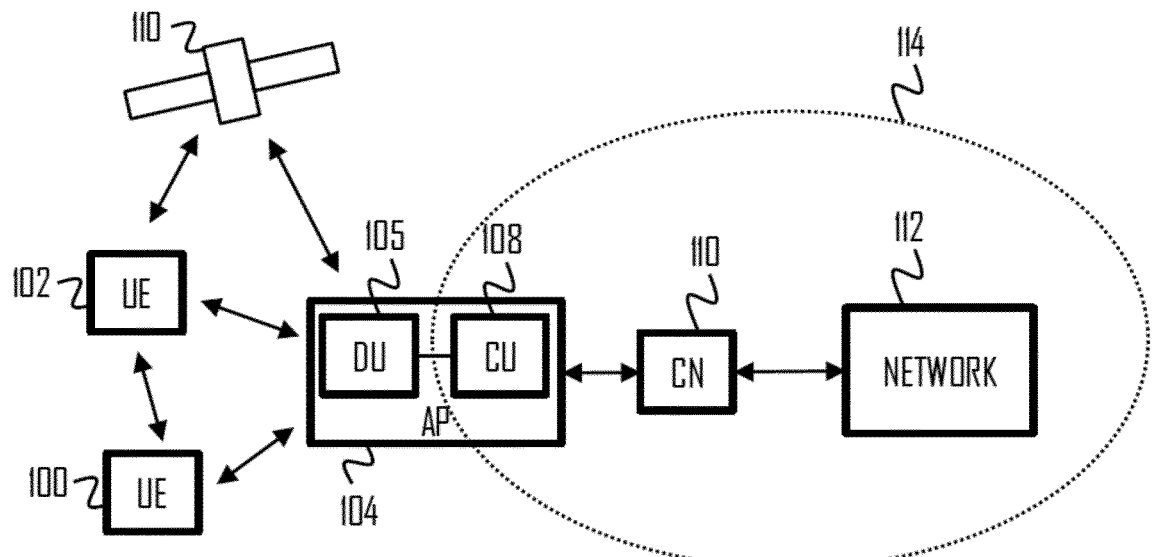

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows terminal devices or user devices 100 and 102 configured to be in a wireless connection on one or more communication channels in a cell with an access node (such as (e/g)NodeB) 104 providing the cell. (e/g)NodeB refers to an eNodeB or a gNodeB, as defined in 3GPP specifications. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used not only for signalling purposes but also for routing data from one (e/g)NodeB to another. The (e/g)NodeB is a computing device configured to control the radio resources of communication system it is coupled to. The NodeB may also be referred to as a base station, an access point, an access node, or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station. 5G specifications define two relay modes: out-of-band relay where same or different carriers may be defined for an access link and a backhaul link; and in-band-relay where the same carrier frequency or radio resources are used for both access and backhaul links. In-band relay may be seen as a baseline relay scenario. A relay node is called an integrated access and backhaul (IAB) node. It has also inbuilt support for multiple relay hops. IAB operation assumes a so-called split architecture having CU and a number of DUs. An IAB node contains two separate functionalities: DU (Distributed Unit) part of the IAB node facilitates the gNB (access node) functionalities in a relay cell, i.e. it serves as the access link; and a mobile termination (MT) part of the IAB node that facilitates the backhaul connection. A Donor node (DU part) communicates with the MT part of the IAB node, and it has a wired connection to the CU which again has a connection to the core network. In the multihop scenario, MT part (a child IAB node) communicates with a DU part of the parent IAB node.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected information communication technology (ICT) devices (sensors, actuators, processors microcontrollers, etc.) embedded in physical objects at different locations. Mobile cyber-physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and typically fully centralized in the core network. The low-latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 112, such as a public switched telephone network or the Internet, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV)

and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 105) and non-real time functions being carried out in a centralized manner (in a centralized unit, CU 108).

It should also be understood that the distribution of functions between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or node B (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway, maritime, and/or aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 110 in the mega-constellation may cover several satellite-enabled network entities that create on-ground cells. The on-ground cells may be fixed to a certain location or be mobile with the mobility of the satellite. The on-ground cells may be created through an on-ground relay node or by a gNB located on-ground or in a satellite. In FIG. 1, the access node 104 represents a terrestrial access node that may be bound to the ground at a specific site, while the satellite access node 110 represents a non-terrestrial access that is aerial. It is also possible to share tasks between the terrestrial and non-terrestrial access node. For example, the non-terrestrial access node may perform certain protocol layer(s) of a radio connection and the terrestrial access node other protocol layer(s) of the radio connection.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

Figure 2:
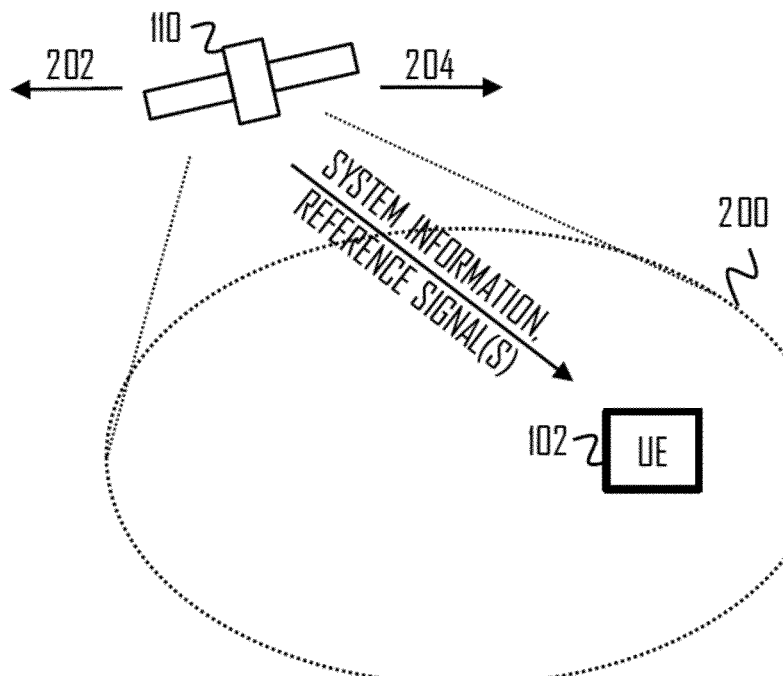
FIG. 2 illustrates a cell provided by a non-terrestrial access node.

FIG. 2 illustrates the non-terrestrial access node 110 providing a cell 200 on the ground level where a terminal device 102 is located. As the terrestrial access node 104, the non-terrestrial access node 110 may transmit system information that comprises various system parameters and configurations applied in the cell 200. The system information may include, for example, random access configurations that shall be used when performing random access on a random access channel (RACH) in connection with establishing a radio resource control (RRC) connection, for example. As known in the art, a terminal device may start the establishment of the RRC connection via a random access procedure. The access node 110 may further broadcast a reference signal that enables the terminal device 102 to measure a channel condition between the terminal device 102 and the access node 110. The terminal device may measure, for example, a received signal strength of the reference signal, e.g. a received signal strength indicator (RSSI) or a reference signal reception power (RSRP). The received signal strength may be used in the random access procedure. The channel conditions are subject to change due to the mobility of the terminal device and, in connection with the non-terrestrial access node 110, due to the mobility of the access node 110. The channel may change rapidly, which may affect the random access procedure. For example, when the access node 110 is moving towards the direction indicated by the arrow 204, the channel conditions probably improve because the terminal device is closer to the access node 110. When the access node 110 is moving towards the direction indicated by the arrow 202, the channel conditions probably degrade because the terminal device is moving away from the access node and eventually falling outside the coverage of the access node.

Figure 3:
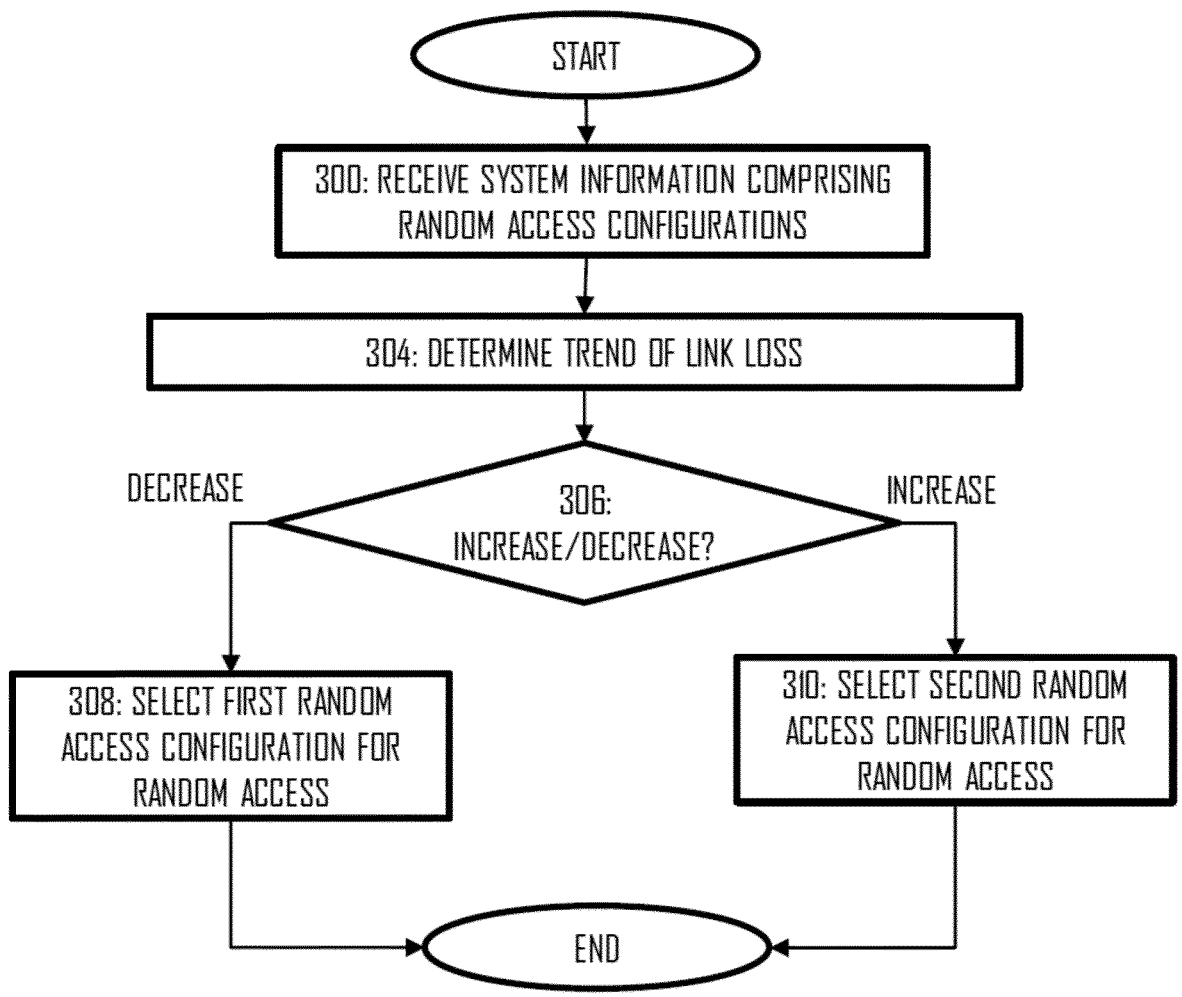
FIGS. 3 and 4 illustrate embodiments of processes for a random access procedure.
Figure 4:
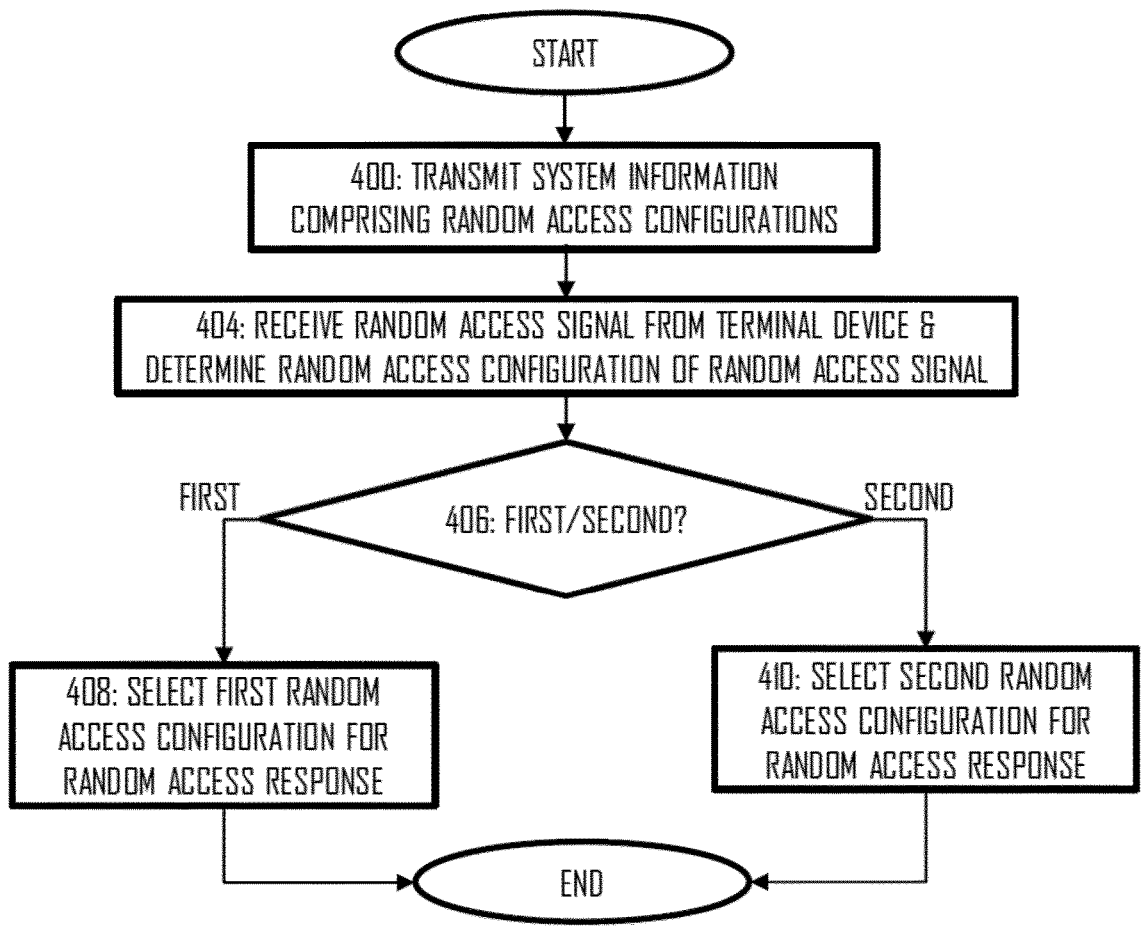

FIGS. 3 and 4 illustrate embodiments of processes for random access. FIG. 3 illustrates a process for a terminal device 102 while FIG. 4 illustrates a process for an access node that may be the terrestrial access node 104 or the non-terrestrial access node 110. Referring to FIG. 3, the process as performed by an apparatus for the terminal device 102 comprises: receiving (block 300), from an access node, system information comprising a first random access configuration and at least a second random access configuration; determining (block 304), whether a link loss between the terminal device 102 and the access node is increasing or decreasing; if the link loss is determined to decrease (from block 306 to block 308), selecting the first random access configuration and performing the random access with the access node by using the first random access configuration; and if the link loss is determined to increase (from block 306 to block 310), selecting the second random access configuration and performing random access with the access node by using the second random access configuration.

Referring to FIG. 4, the process as performed by an apparatus for the access node comprises: causing transmission (block 400) of system information comprising a first random access configuration and at least a second random access configuration; receiving (block 404) a random access signal from a terminal device and determining (block 406) which one of the first random access configuration and at least the second random access configuration was used by the terminal device for transmitting the random access signal; and causing (block 408 or 410) transmission of a random access response signal to the terminal device by using the determined random access configuration.

In an embodiment, the first random access configuration and the second random access configuration define one or more parameters of the random access, wherein one or more random access parameters of the first random access configuration define a different random access configuration than one or more parameters of the second random access configuration. The one or more parameters of the first and second random access configuration may be the same, but parameter values may differ. For example, the one or more random access parameters may be a part of enhanced coverage level (ECL) configuration defined in the 3GPP specifications. The cellular communication system may support multiple coverage level configurations for the random access, each coverage level configuration defining one or more parameters for physical layer random access on a physical random access channel. For example, the one or more parameters may specify different levels to the coverage of a random access message transmitted by the terminal device or by the access node. The terminal device may transmit a random access preamble during the random access procedure, and the one or more parameters may define transmission reliability of the transmission. Similarly, the access node may transmit a random access response message that is responsive to the random access preamble, and the one or more parameters may define transmission reliability of the random access response. Instead of, or in addition to, the random access preamble transmission, the selected random access configuration may be used for early data transmission during the random access procedure. The early data may be transmitted after receiving the random access response.

In an embodiment, the terminal device thus proactively anticipates the link loss during the random access procedure and selects the random access configuration on the basis of estimating the link loss during the coming random access procedure that has not yet started.

Figure 5:
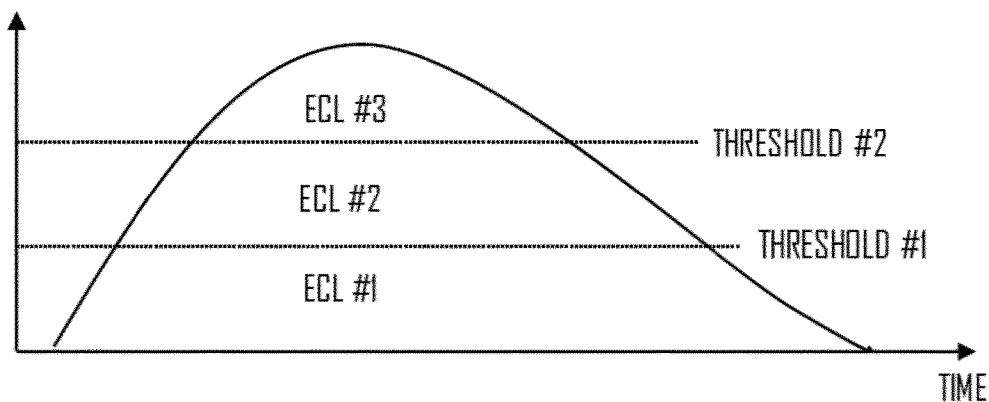
FIG. 5 illustrates an effect of selecting a random access configuration.

The access node may transmit a reference signal, and the terminal device may be configured to measure the reference signal. The link loss may be determined on the basis of the measurement or by other means, as described below. In an embodiment, the link loss is measured by the terminal device by using a received signal strength of the reference signal received by the terminal device from the access node. The selection of the random access configuration may thus be dependent on the received signal strength measured by the terminal device. FIG. 5 illustrates the relation between the received signal strength (correlating with the link loss inversely) and the coverage achievable with the different ECL configurations. FIG. 5 illustrates three ECL configurations, but the number may be different depending on the system configuration.

Referring to FIG. 5, the solid line represents the received signal strength measured by the terminal device and changing over time, e.g. due to the mobility of the non-terrestrial access node 110. The different ECL configurations #1, #2, and #3 are illustrated as horizontal slices in FIG. 5. Each ECL configuration thus effectively indicates a time interval when the received signal strength is above a level where the random access procedure can be completed successfully. The ECL configuration #3 may be considered to be the most aggressive, i.e. the least reliable, thus requiring the highest level of the received signal strength and the lowest link loss. On the other hand, the ECL configuration #1 may be considered the most reliable, and the respective random access parameter(s) may provide the most reliable random access. The ECL configuration #2 provides the random access parameter(s) that provide reliability between the ECL configurations #1 and #3. FIG. 5 also illustrates thresholds #1 and #2 that may define the boundaries of the different ECL configurations in terms of the measured received signal strength (RSS). A conventional solution for the terminal device is to measure the current received signal strength and perform a comparison with the threshold(s) #1 and/or #2. If the RSS is below the threshold #1, the ECL configuration #1 is selected. If the RSS is above the threshold #2, the ECL configuration #3 is selected. If the RSS is between the threshold #1 and #2, the ECL configuration #2 is selected. However, such a solution does not take into account the development of the RSS. For example, the RSS may be degrading and be on the coverage boundary of the ECL configuration #2 at the time of measuring the RSS. As a consequence, the selection may result in failing random access while ECL #1 could have been more suitable because of the declining trend in the RSS.

While only three ECL configurations are disclosed as embodiments of the random access configurations, the number may differ in other embodiments.

In an embodiment, the random access configurations transmitted/received as the system information may define one or more of the following parameters: a number of repeated transmissions of a random access signal, a maximum number of transmission attempts of the random access signal, a number of physical random access channel frequency resources, and a transmission timing of the random access signal. The different random access configurations may define different sets of parameters or the same parameters but different parameter values.

In an embodiment, the first random access configuration and the second random access configuration define different numbers of transmission repetitions for the random access preamble and/or the random access response. The higher number of transmission repetitions improves the reliability of the transmission with the logic that the receiver may then coherently combine the signal repetitions (or signal duplicates), thus constructively summing the desired signal while reducing the noise signal via averaging. Accordingly, the low number of transmission repetitions is more effective in terms of latency, spectrum use, and power consumption. This procedure is currently defined in the 3GPP specifications at least for narrowband-IoT/machine-type communication (MTC) links but is equally applicable to other link types as well, e.g. mobile broadband (MBB) or ultra-reliable low latency communication (URLLC) links. Reflecting this feature to the embodiment of FIG. 3, the first random access configuration may be associated with a first number of repeated transmissions of a signal and the second random access configuration with a second number of repeated transmissions of the signal, wherein the first number is smaller than the second number. Accordingly, the second random access configuration provides a more reliable and less efficient random access procedure, while the first random access configuration provides a less reliable but more efficient random access procedure in terms of spectrum use, latency, and power consumption.

In an embodiment, the terminal device determines at least one threshold for selecting a random access configuration, compares the measured received signal strength with the at least one threshold and selects the first random access configuration or the second random access configuration further on the basis of the comparison. The at least one threshold may comprise the threshold #1 and/or the threshold #2 illustrated in FIG. 5. In this embodiment, both the current value of the RSS and the trend of the RSS may be used in the selection of the random access configuration. The weight for each of the current measured value of the RSS and the trend may depend on the implementation, and the appropriate weighting may be concluded in response to field testing and/or employing machine learning. The machine learning may use past decisions and respective outcomes of the random access procedures. For example, if selection of a given (value of a) random access configuration resulted in a successful random access procedure under certain conditions, the same selection may be applied in the future under the same or similar conditions. On the other hand, if selection of a given (value of a) random access configuration resulted in a failed random access procedure under certain conditions, the same selection may be avoided in the future under the same or similar conditions.

In an embodiment, the terminal device selects the first random access configuration, if the link loss is below a threshold and determined to be decreasing. In the embodiment of FIG. 5, the ECL configuration #3 may be selected when the measured RSS is above the threshold #2, or the ECL configuration #2 may be selected when the measured RSS is above the threshold #1 but below threshold #2 and increasing. Further, the terminal device may select the second random access configuration if the link loss is above the threshold and determined to be increasing. In the embodiment of FIG. 5, the ECL configuration #1 may be selected when the measured RSS is below the threshold #1, or the ECL configuration #2 may be selected when the measured RSS is below the threshold #2 but above threshold #1 and decreasing. A delta of the link loss may be taken into account in these embodiments. For example, if the link loss is determined to be increasing or decreasing but that the change is less than a determined amount, the terminal device may determine that the link loss is staying substantially at a constant level and select a random access configuration only on the basis of the current link loss level. On the other hand, if the link loss is changing more than the determined amount, the selected random access configuration may be different from the random access configuration mapped to the current link loss level. For example, if the link loss is decreasing by more than the determined amount, the random access configuration mapped to the next lower level of the link loss may be selected. And if the link loss is increasing by more than the determined amount, the random access configuration mapped to the next higher level of the link loss may be selected.

From another perspective, the terminal device may estimate a decrease in the link loss and to select the first random access configuration on the basis of the estimated decrease, or to estimate an increase in the link loss and to select the second random access configuration on the basis of the estimated increase. The terminal device may estimate not only the trend but also an amount in the increase/decrease and select the random access configuration on the basis of the amount. Referring again to FIG. 5, let us assume that the current link loss would cause selection of the random access configuration corresponding to ECL configuration #2. Upon estimating the amount of increase or decrease in the link loss, the selected random access configuration may be any one of the random access configurations, depending on the amount. For example, if the increase or decrease is small, the selected random access configuration may still be the same random access configuration as that linked to the current link loss. In this case, the above-described first random access configuration and the second random access configuration may even be the same random access configuration. If the amount in the decrease of the link loss (increase in the RSS) is estimated high enough, selection of a random access configuration corresponding to the ECL configuration #3 may be triggered. On the other hand, if the amount in the increase of the link loss (decrease in the RSS) is estimated high enough, selection of a random access configuration corresponding to the ECL configuration #1 may be triggered. In these latter two cases, the above-described first and second random access configurations are different random access configurations.

In an embodiment, upon determining that the link loss is increasing, the terminal device postpones the random access until either the link loss decreases or a new cell provided by another access node becomes available for said random access. A further threshold for the link loss may be specified for triggering the decision-making. The decision of postponing may be triggered upon detecting that the link loss has increased above a certain threshold level. Referring to FIG. 5, if the terminal device measures the current RSS to be in the range for the ECL configuration #1 (below threshold #1) and decreasing, the terminal device may postpone the random access in expectation that the terminal device is falling outside the coverage area of the access node.

Further, the terminal device may select the first random access configuration, if the link loss is above a threshold but determined to be decreasing or select the second random access configuration if the link loss is below the threshold but determined to be increasing. In the embodiment of FIG. 5, the ECL configuration #3 may be selected when the measured RSS is below the threshold #2 but increasing, or the ECL configuration #2 may be selected when the measured RSS is above the threshold #2 but decreasing. Similarly, the ECL configuration #2 may be selected when the measured RSS is below the threshold #1 but increasing, or the ECL configuration #1 may be selected when the measured RSS is above the threshold #1 but decreasing. In this manner, this embodiment proactively anticipates the trend in the RSS and proactively changes to the more reliable or more effective random access configuration.

In an embodiment, the at least one threshold is received by the terminal device from the access node as a part of the system information. In another embodiment, the thresholds are stored in the terminal device and need not to be signalled separately.

In an embodiment, the time span used for estimating whether the link loss is increasing or decreasing may be an estimated duration of the random access procedure. Therefore, the terminal device may determine in block 306 whether the link loss will increase or decrease from the current link loss level, if the terminal device would initiate the random access procedure. The terminal device may estimate the link loss during the random access procedure and select the random access configuration on the basis of the estimate. The selection may be based on the greatest link loss or an average link loss estimated for the random access procedure. The time span of the random access procedure may depend on the selection of the random access configuration, e.g. the number of repetitions of the random access signal, and the estimation may take this variation into account. For example, the estimate may be provided for each time span of the random access configurations.

Still referring to FIG. 5, the number of random access configurations received from the access node may be more than two, e.g. three as in FIG. 5 or even higher. For a given situation from the viewpoint of the terminal device, the first random access configuration may be selected in a situation where the terminal device expects the RSS to increase (link loss to decrease) during or for the random access procedure, the second random access configuration may be selected in a situation where the terminal device expects the RSS to decrease (link loss to increase) during or for the random access procedure, and a third random access configuration may be selected in a situation where the terminal device expects the RSS and/or link loss to stay or to determine that information on whether the link loss is increasing or decreasing is not available. Referring to FIG. 5, if the current RSS is in the zone associated with the ECL configuration #2, the first random access configuration may belong to the ECL configuration #3, the second random access configuration may belong to the ECL configuration #1, and the third random access configuration may belong to the ECL configuration #2.

To summarize the logic, a random access configuration providing a more reliable random access procedure may be selected in a situation where the link loss is increasing but still at a range that would cause selection of a random access configuration providing a less reliable random access procedure, if the RSS would remain at a current level. In a similar manner, a random access configuration providing a more efficient random access procedure may be selected in a situation where the link loss is decreasing but still at a range that would cause selection of a random access configuration providing a more reliable random access procedure, if the RSS would remain at a current level.

In an embodiment, the random access configurations transmitted/received as the system information may define the respective random configurations broadly such that there is room for selecting at least some of the random access parameters autonomously by the terminal device within the signalled random access configurations. For example, the signalled random access configurations may define a subset of the random access parameters while the terminal device may select the other random access parameters autonomously.

Figure 6:
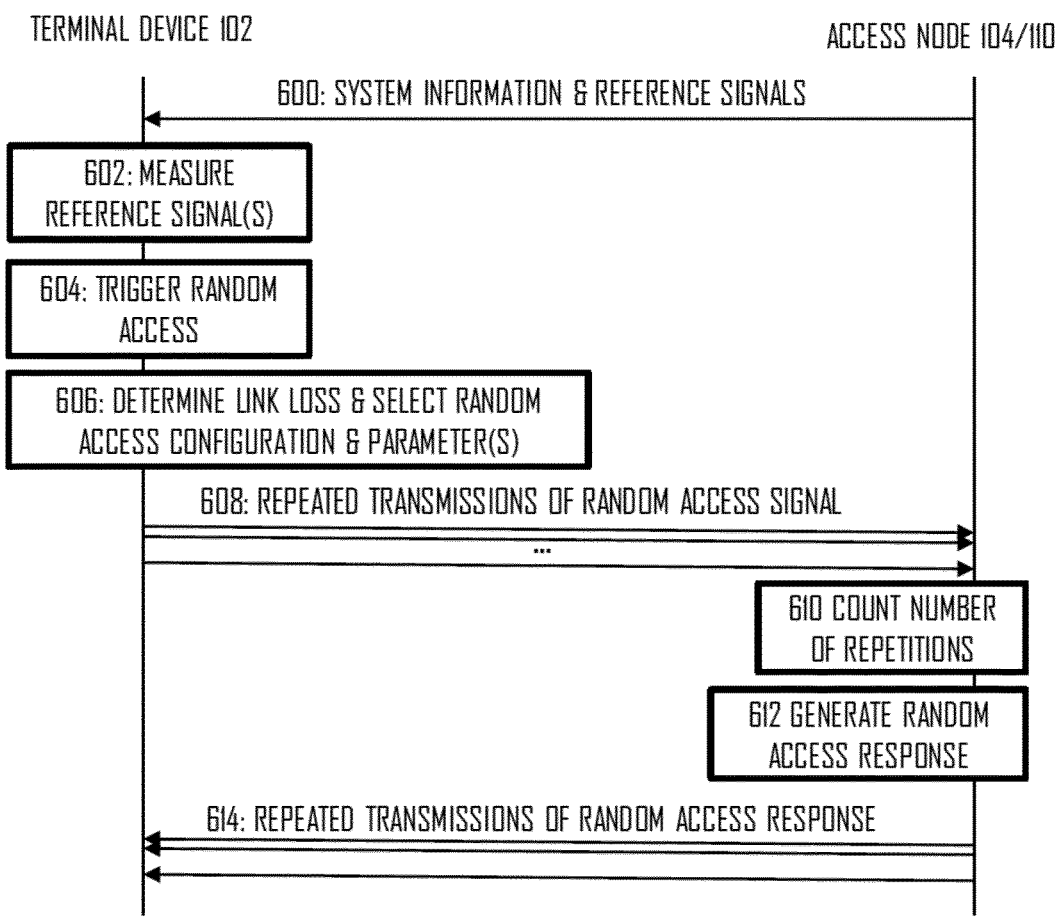
FIG. 6 illustrates a signalling diagram for carrying out a random access procedure by using a random access configuration selected according to an embodiment.

FIG. 6 illustrates a signalling diagram of a procedure combining the processes of FIGS. 3 and 4 and, additionally, encompassing the number of repetitions of signal transmissions as an embodiment for the random access configuration. Referring to FIG. 6, the access node 104 or 110 may periodically broadcast system information and reference signals in step 600. The terminal device 102 may store the system information received in step 600 and, optionally, measure a received signal strength of the reference signal (block 602). This may be performed in an idle mode where the terminal device has no RRC connection with the access node or in an inactive mode where the terminal device has an RRC connection but the RRC connection is in an inactive state. In block 604, the terminal device determines to trigger a random access procedure for establishing or reconfiguring an RRC connection. Block 604 may be triggered upon detecting uplink data that shall be transmitted or upon receiving a paging message, from the access node 104, for example. Upon triggering the random access procedure, the terminal device may determine the current RSS level (link loss) and, additionally, a trend of the RSS (link loss) in block 606. Depending on the current RSS (link loss) level and the trend (increasing, maintaining, or decreasing), the terminal device may select an appropriate random access configuration, e.g. the number of repetitions for transmitting the random access message such as the random access preamble. As described above, different random access configurations may be defined for the different combinations of the current link loss level and the trend of the link loss level. In step 608, the random access message or signal is transmitted with the selected random access parameter(s) of the selected random access configuration, e.g. the number of repetitions of the random access message. Meanwhile, the access node may monitor the random access channel and detect the random access message in step 608. The access node may accumulate the repeated transmissions of the random access signal coherently and count the number of repetitions. The repetitions may be transmitted consecutively, thus effectively making the random access message transmission periodic, wherein the number of periods corresponds to the number of transmission repetitions. Upon counting the number of repetitions and extracting the contents of the random access message, the access node may generate a random access response (step 612) responding to the random access message received in step 608. In step 614, the access node transmits the random access response by using at least partially the same random access parameter(s) as used by the terminal device for transmitting the random access message in step 608, e.g. the number of repetitions counted in block 610. Accordingly, the random access response will be transmitted with substantially the same coverage as the random access message. The terminal device receives the random access response in step 614 and combines the repetitions coherently and, thereafter, proceeds with the random access procedure and establishment or reconfiguration of the RRC connection. Upon setting up the RRC connection, data may be transferred between the access node and the terminal device.

Figure 7:
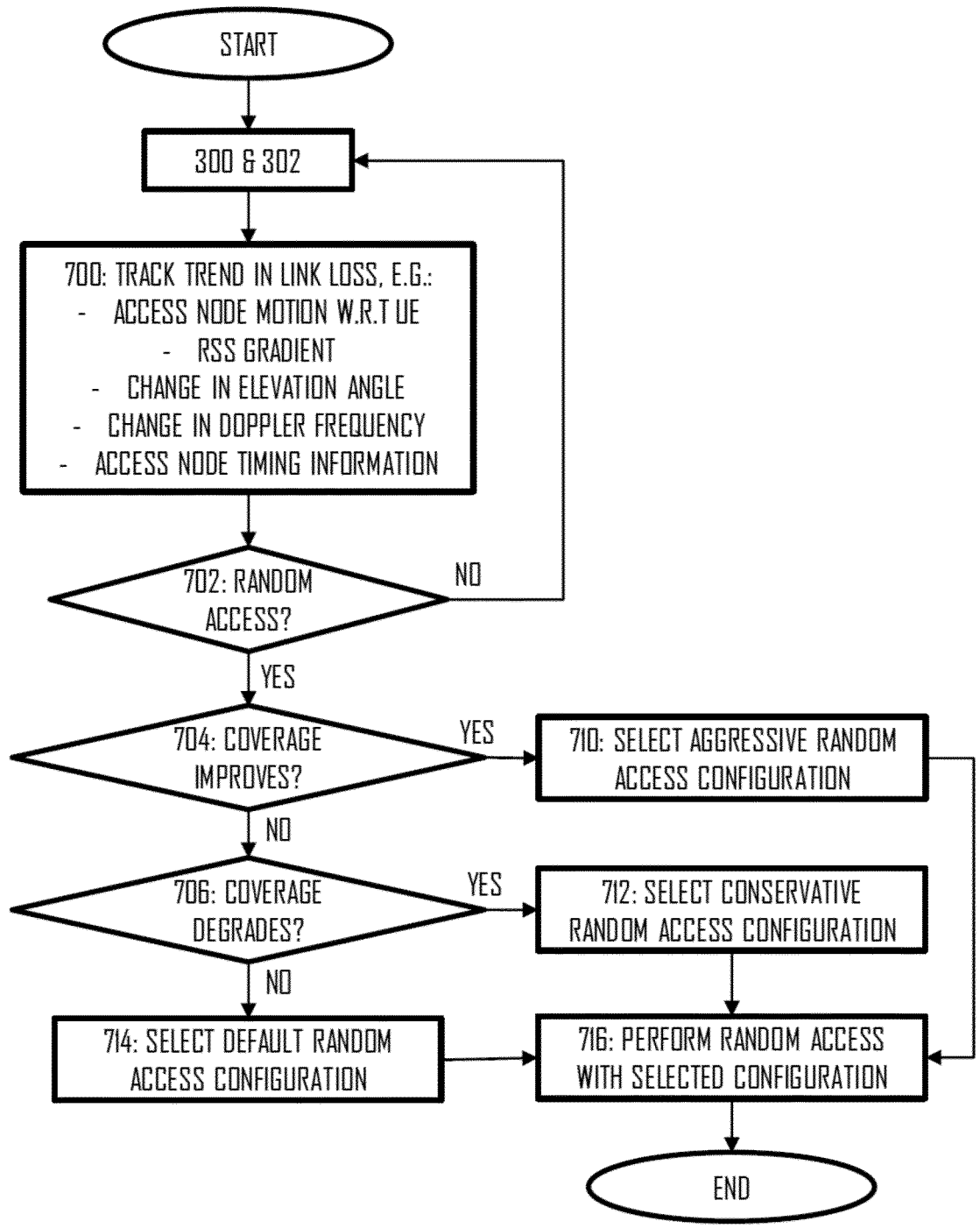
FIG. 7 illustrates an embodiment of the process of FIG. 3.

FIG. 7 illustrates an embodiment of the process of FIG. 3. Referring to FIG. 7, the process may start with blocks 300 and 302. In block 700, the terminal device may monitor the trend of the link loss that may be represented or at least associated with the trend of the RSS of the reference signal measured by the terminal device. This may include multiple measurements of the RSS or, more generally, multiple observations of the link loss. Block 700 illustrates a number of embodiments for tracking the trend of the link loss and one or more of them may be used to estimate and monitor the trend of the link loss or coverage.

In an embodiment, the trend in the link loss is monitored on the basis of said measuring the received signal strength of the reference signal and determining whether the received signal strength of the reference signal is increasing or decreasing. In other words, the apparatus may monitor a gradient of the measured RSS.

In another embodiment where the access node is a non-terrestrial access node, a motion trajectory of the access node with respect to the apparatus performing the process of FIG. 7 is determined and, on the basis of said motion trajectory, it is determined whether the link loss is increasing or decreasing. For example, if the motion trajectory is towards the apparatus, the link loss may be determined to be decreasing. If the motion trajectory is away from the apparatus, the link loss may be determined to be increasing. The motion trajectory may be determined on the basis of at least one of the following parameters: ephemeris data of the access node, a change in an elevation angle of the access node with respect to the apparatus, a change in a measured Doppler frequency of the reference signal, a change in timing information of the access node.

The ephemeris data may be broadcast by the non-terrestrial access node and indicate the location of the non-terrestrial access node (current and predicted) and timing information. The ephemeris data may be similar to the ephemeris data broadcast by global navigation satellite systems. The ephemeris data may be used by the terminal device to estimate its location relative to the non-terrestrial access node and, thus, gaining the above-described trajectory information.

The change in the elevation angle may be determined on the basis of the ephemeris data and/or by measuring and monitoring a reception direction of signals received from the non-terrestrial access node. Since the access node is typically aerial, there is typically a line-of-sight between the access node and the terminal device, thus enabling accurate measuring and tracking of the elevation angle. If the elevation angle is increasing, the terminal device may determine the access node to be moving towards the terminal device and the link loss be decreasing. If the elevation angle is decreasing, the terminal device may determine the access node to be moving away from the terminal device and the link loss to be increasing.

The change in the measured doppler frequency of the reference signal is a direct indication of whether a distance between the terminal device and the access node is increasing or decreasing. If the doppler frequency positive, the distance and the link loss is decreasing and the RSS strength may be determined to increase. If the doppler frequency is negative, the distance and the link loss is increasing and the RSS strength may be determined to decrease.

The change in the timing information of the access node may comprise timing information of a periodic signal transmitted by the access node, or another timing information related to the access node. The terminal device may monitor, for example, reception timing of a periodic signal such as a synchronization signal (a primary and/or secondary synchronization signal) that may be an embodiment of the reference signal. If the reception timing indicates that the time interval between consecutive receptions of the periodic signal decreases, the terminal device may determine that the distance between the access node and the terminal device is decreasing and, as a consequence, the link loss is decreasing. If the reception timing indicates that the time interval between consecutive receptions of the periodic signal increases, the terminal device may determine that the distance between the access node and the terminal device is increasing and, as a consequence, the link loss is increasing.

In block 702, it is determined whether or not the random access shall be triggered. If there is no need for random access the process may return to block 300, 302, or 700. If the random access is triggered, the process may proceed to blocks 704 to 706 where the results of the monitoring performed in block 700 are used to select one or more parameters for the random access, e.g. the number of repetitions for the random access message. If the coverage is determined to be increasing/improving, the process may proceed from block 704 to block 710 where a more aggressive random access configuration may be selected than what would be selected on the basis of the current link loss level only. Accordingly, it is determined that the coverage will improve (link loss will decrease) during the random access procedure and the random access procedure can be successfully completed by using a more efficient procedure. If the coverage is determined to be decreasing/degrading (link loss increasing), the process may proceed from block 706 to block 712 where a more conservative (reliable) random access configuration may be selected than what would be selected on the basis of the current link loss level only. Accordingly, it is determined that the coverage will degrade (link loss increase) during the random access procedure and the random access procedure can be successfully completed by using a more reliable procedure. If the coverage or link loss is determined to be staying substantially on a current level, or that the information on the development of the coverage or link loss is not available, the process may proceed from block 706 to block 714 where a default random access configuration may be selected, e.g. the random access configuration selected on the basis of the current link loss level only. Accordingly, it is determined that the coverage and the link loss will stay on the currently measured level during the random access procedure and the random access procedure can be successfully completed by using the default procedure. In block 716, the random access procedure is performed by using the random access configuration selected in either block 710, 712, or 714.

Figure 8:
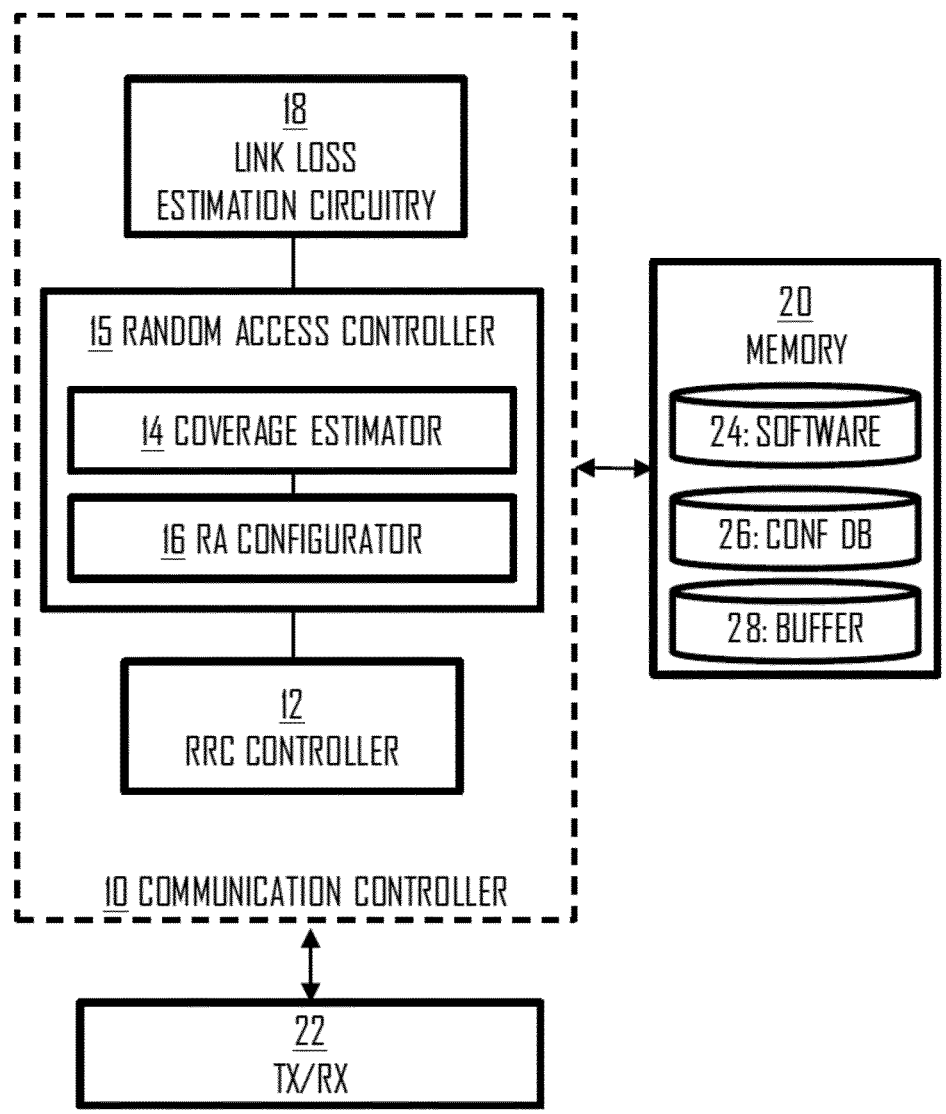
FIGS. 8 and 9 illustrate block diagrams of structures of apparatuses according to some embodiments.

FIG. 8 illustrates an apparatus comprising means for carrying out the process of FIG. 3 or any one of the embodiments described above. The apparatus may comprise a processing circuitry, such as at least one processor, and at least one memory 20 including a computer program code (software) 24, wherein the at least one memory and the computer program code (software) are configured, with the at least one processor, to cause the apparatus to carry out the process of FIG. 3 or any one of its embodiments described above. The apparatus may be for the terminal device 100 or 102. The apparatus may be a circuitry or an electronic device realizing some embodiments of the invention in the terminal device. The apparatus carrying out the above-described functionalities may thus be comprised in such a device, e.g. the apparatus may comprise a circuitry such as a chip, a chipset, a processor, a micro controller, or a combination of such circuitries for the terminal device. The at least one processor or a processing circuitry may realize a communication controller 10 controlling communications in a radio interface of the cellular communication system in the above-described manner. The communication controller may be configured to establish and manage radio connections, transfer of data over the radio connections.

The communication controller 10 may comprise an RRC controller 12 configured to establish, manage, and terminate radio connections, e.g. the RRC connections. The RRC controller 12 may be configured, for example, to establish and reconfigure the RRC connections. The RRC controller may perform block 604 and/or block 702, for example.

The communication controller 10 may further comprise a link loss estimation circuitry 18 configured to measure the current link loss level, e.g. a strength of a reference signal received from an access node (block 302). The link loss estimation circuitry 18 may be configured to estimate the link loss on a regular basis, as described above.

The communication controller 10 may further comprise a random access controller 15 configured to perform a random access procedure, for example when triggered by the RRC controller. The random access controller may comprise a coverage estimator circuitry 14 configured to determine a cell where the apparatus currently camping and to estimate the above-described trend in the coverage of the cell, e.g. on the basis of the gradient of the RSS measurements received from the RSS measurement circuitry 18 and/or on the basis of the relative motion between the apparatus and an access node providing the cell. The trend may then be output to a random access configurator 16 configured to select random access configuration and respective random access parameter(s) for the random access procedure on the basis of the trend and, optionally, the current link loss level, as received from the link loss estimation circuitry. Upon selecting the random access parameter(s), the random access controller may generate a random access message and transmit the random access message, e.g. the random access preamble, by using the random access parameter(s).

The memory 20 may be implemented using any suitable data storage technology, such as semiconductor-based memory devices, flash memory, magnetic memory devices and systems, optical memory devices and systems, fixed memory and removable memory. The memory 20 may comprise a configuration database 26 for storing configuration parameters, e.g. the random access configurations as received from the access node in the system information and the link loss values estimated by the link loss estimation circuitry. The memory 20 may further store a data buffer 28 for uplink data to be transmitted from the apparatus.

The apparatus may further comprise a communication interface 22 comprising hardware and/or software for providing the apparatus with radio communication capability, as described above. The communication interface 22 may include, for example, an antenna, one or more radio frequency filters, a power amplifier, and one or more frequency converters. The communication interface 22 may comprise hardware and software needed for realizing the radio communications over the radio interface, e.g. according to specifications of an LTE or 5G radio interface.

Figure 9:
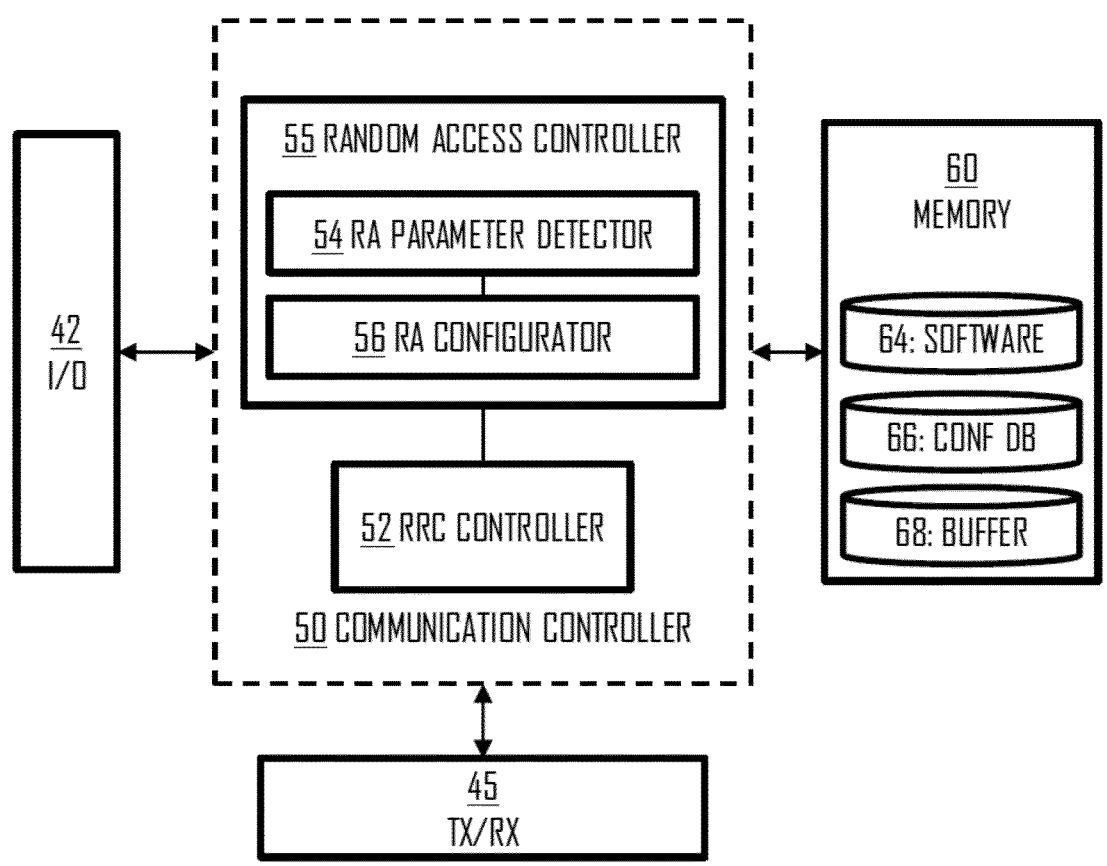

FIG. 9 illustrates an apparatus comprising a processing circuitry, such as at least one processor, and at least one memory 60 including a computer program code (software) 64, wherein the at least one memory and the computer program code (software) are configured, with the at least one processor, to cause the apparatus to carry out functions of the access node 104 or 110 in the process of FIG. 4 or any one of its embodiments described above. The apparatus may be for the access node. The apparatus may be a circuitry or an electronic device realizing some embodiments of the invention in the access node. The apparatus carrying out the above-described functionalities may thus be comprised in such a device, e.g. the apparatus may comprise a circuitry such as a chip, a chipset, a processor, a micro controller, or a combination of such circuitries for the access node. In other embodiments, the apparatus is the access node. The at least one processor or a processing circuitry may realize a communication controller 50 controlling communications with terminal devices over the radio interface in the above-described manner. The communication controller may be configured to establish and manage radio (RRC) connections and transfer of data over the radio connections. The communication controller may also be configured to broadcast system information and reference signals over the radio interface.

The communication controller 50 may comprise an RRC controller 52 configured to establish, manage, and terminate radio connections with terminal devices served by the access node. The RRC controller 52 may be configured, for example, to establish and reconfigure the RRC connections with the terminal devices.

The communication controller 50 may further comprise a random access controller 55 configured to carry out random access procedures with terminal devices. The random access controller 55 may be configured to monitor a random access channel provided by the access node and, upon detecting a random access message comprising a random access preamble on the random access channel, to generate a response to the random access message according to the system specifications, e.g. according to LTE or 5G specifications. In connection with the random access procedure, the random access controller may involve the RRC controller in the form of initiating establishment of a RRC connection. The random access controller may comprise a random access parameter detector 54 configured to evaluate the received random access message and determine one or more random access parameters used for transmitting the random access message. Upon determining the one or more random access parameters, the random access parameter detector 54 may output the determined random access parameter(s) to a random access configurator configured to apply the random access parameter(s) to a random access response message that is about to be transmitted as a response to the terminal device from which the random access message was received, following the embodiments described above.

The memory 60 may be implemented using any suitable data storage technology, such as semiconductor-based memory devices, flash memory, magnetic memory devices and systems, optical memory devices and systems, fixed memory and removable memory. The memory 60 may comprise a configuration database 66 for storing configuration parameters, e.g. the system information broadcast by the apparatus.

The apparatus may further comprise a radio frequency communication interface 45 comprising hardware and/or software for providing the apparatus with radio communication capability with the terminal devices, as described above. The communication interface 45 may include, for example, an antenna array, one or more radio frequency filters, a power amplifier, and one or more frequency converters. The communication interface 42 may comprise hardware and software needed for realizing the radio communications over the radio interface, e.g. according to specifications of an LTE or 5G radio interface.

The apparatus may further comprise another communication interface 42 for communicating towards the core network. The communication interface may support respective communication protocols of the cellular communication system to enable communication with other access nodes, with other nodes of the radio access network, and with nodes in the core network and even beyond the core network. The communication interface 42 may comprise necessary hardware and software for such communications.

As used in this application, the term 'circuitry' refers to one or more of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described in FIG. 3, 4, or any of the embodiments thereof may also be carried out in the form of one or more computer processes defined by one or more computer programs. The computer program(s) may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package.

Depending on the processing power needed, the computer program may be executed in a single electronic digital processing unit or it may be distributed amongst a number of processing units.

Embodiments described herein are applicable to wireless networks defined above but also to other wireless networks. The protocols used, the specifications of the wireless networks and their network elements develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. Embodiments are not limited to the examples described above but may vary within the scope of the claims.

The invention claimed is:

1. An apparatus for a terminal device of a cellular communication system, comprising at least one processor, and at least one memory storing instructions that, when executed by the at least one processor, cause the apparatus at least to:
   receive, from an access node, system information comprising a first random access configuration and at least a second random access configuration, wherein the access node is a non-terrestrial access node;
   determine a motion trajectory of the access node with respect to the apparatus and determine, on the basis of said motion trajectory, whether a link loss between the terminal device and the access node is increasing or decreasing;
   if the link loss is determined to decrease, select the first random access configuration and performing the random access with the access node by using the first random access configuration; and
   if the link loss is determined to increase, select the second random access configuration and performing random access with the access node by using the second random access configuration.

2. The apparatus of claim 1, wherein the apparatus further caused to:
   determine the motion trajectory on the basis of at least one of the following parameters:
   ephemeris data of the access node,
   a change in an elevation angle of the access node with respect to the apparatus,
   a change in a measured Doppler frequency of a signal received from the access node, or
   a change in timing information of the access node.

* * * * *